United States Patent
Hong

(10) Patent No.: US 12,208,842 B2
(45) Date of Patent: Jan. 28, 2025

(54) STEER-BY-WIRE STEERING APPARATUS

(71) Applicant: HL MANDO CORPORATION, Gyeonggi-do (KR)

(72) Inventor: Seung Gyu Hong, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 690 days.

(21) Appl. No.: 17/436,579

(22) PCT Filed: Feb. 17, 2020

(86) PCT No.: PCT/KR2020/002219
§ 371 (c)(1),
(2) Date: Sep. 3, 2021

(87) PCT Pub. No.: WO2020/184857
PCT Pub. Date: Sep. 17, 2020

(65) Prior Publication Data
US 2022/0144335 A1 May 12, 2022

(30) Foreign Application Priority Data
Mar. 8, 2019 (KR) .......... 10-2019-0026702

(51) Int. Cl.
*B62D 5/04* (2006.01)
*B62D 5/00* (2006.01)
*B62D 6/00* (2006.01)

(52) U.S. Cl.
CPC .......... *B62D 5/0463* (2013.01); *B62D 5/006* (2013.01); *B62D 5/0415* (2013.01); *B62D 5/0454* (2013.01); *B62D 6/008* (2013.01)

(58) Field of Classification Search
CPC .......... B62D 5/0463; B62D 5/0415
See application file for complete search history.

(56) References Cited

U.S. PATENT DOCUMENTS

| | | | |
|---|---|---|---|
| 6,481,526 B1 | 11/2002 | Millsap et al. | |
| 8,066,092 B2 * | 11/2011 | Shimizu | B62D 5/0469 180/443 |
| 2004/0088093 A1 | 5/2004 | Yao et al. | |
| 2007/0131476 A1 | 6/2007 | Kubokawa et al. | |
| 2007/0163526 A1 | 7/2007 | Sugiura et al. | |

(Continued)

FOREIGN PATENT DOCUMENTS

| CN | 101033788 | 9/2007 |
|---|---|---|
| CN | 101266459 | 9/2008 |

(Continued)

OTHER PUBLICATIONS

Office Action dated Nov. 10, 2023 for Chinese Patent Application No. 202080019839.3 and its English translation from Global Dossier.

(Continued)

*Primary Examiner* — Jacob D Knutson
(74) *Attorney, Agent, or Firm* — WOMBLE BOND DICKINSON (US) LLP

(57) ABSTRACT

According to embodiments of the present invention, when a driver applies steering torque greater than the reaction torque of a reaction motor to a steering shaft, the steering shaft is mechanically prevented from rotating any more, and thus the driver's steering feel can be improved.

19 Claims, 12 Drawing Sheets

(56) References Cited

U.S. PATENT DOCUMENTS

| | | | |
|---|---|---|---|
| 2014/0353065 A1* | 12/2014 | Chae | B62D 5/0403 |
| | | | 180/444 |
| 2017/0072992 A1 | 3/2017 | Schlegel et al. | |
| 2017/0350776 A1 | 12/2017 | Woo | |
| 2018/0017149 A1 | 1/2018 | Takeuchi et al. | |
| 2018/0080426 A1 | 3/2018 | Kuramochi | |
| 2018/0141585 A1 | 5/2018 | Kim et al. | |
| 2018/0362079 A1 | 12/2018 | Zuzelski et al. | |

FOREIGN PATENT DOCUMENTS

| | | | | |
|---|---|---|---|---|
| CN | 103089930 | | 5/2013 | |
| CN | 105197099 | | 12/2015 | |
| CN | 105691445 | | 6/2016 | |
| CN | 105836035 | | 8/2016 | |
| DE | 102015120207 A1 * | | 5/2017 | |
| EP | 3380390 | | 10/2018 | |
| JP | 2002-302055 | | 10/2002 | |
| JP | 2004-322808 | | 11/2004 | |
| JP | 2005-329849 | | 12/2005 | |
| JP | 2007-230360 | | 9/2007 | |
| JP | 4340903 | | 10/2009 | |
| JP | 2010-52628 | | 3/2010 | |
| JP | 2010-100104 | | 5/2010 | |
| JP | 2016159895 A * | | 9/2016 | B62D 5/006 |
| KR | 90-2007 | | 2/1990 | |
| KR | 10-2009-0007104 | | 1/2009 | |
| KR | 2009007104 A * | | 1/2009 | |
| KR | 10-2011-0037614 | | 4/2011 | |
| KR | 10-2011-0062630 | | 6/2011 | |
| KR | 10-2015-0013413 | | 2/2015 | |
| KR | 10-1836744 | | 3/2018 | |
| KR | 10-2019-0007541 | | 1/2019 | |
| WO | 2007/049444 | | 5/2007 | |
| WO | 2012/017886 | | 2/2012 | |
| WO | WO-2012056213 A1 * | | 5/2012 | B62D 5/0403 |

OTHER PUBLICATIONS

Notice of Allowance dated Jan. 23, 2024 for Korean Patent Application No. 10-2019-0026702 and its English translation from Global Dossier.

Notice of Allowance dated Feb. 6, 2024 for Chinese Patent Application No. 202080019839.3 and its English translation from Global Dossier.

Wang Jun; "Intelligent Driving Vehicle Lateral Tracking Control and Actual Vehicle Testing"; Technical Center of SAIC Motor Corporation, Shanghai, Jul. 12, 2018. (English machine translation by Google Translate).

Chen Xinbo et al.; "Double Wishbone Suspension-torsion Bar Spring-Electric Wheel Module Development and Application", Chinese Journal of Mechanical Engineering, vol. 41 No. 12, Dec. 2005. (English machine translation by Google Translate).

International Search Report for PCT/KR2020/002219 mailed on May 28, 2020 (now published as WO 2020/184857) and English translation prepared by the WIPO.

Written Opinion of the International Searching Authority for PCT/KR2020/002219 mailed on May 28, 2020 (now published as WO 2020/184857) with English translation provided by Google Translate.

* cited by examiner

STEER-BY-WIRE STEERING APPARATUS

CROSS-REFERENCE TO RELATED APPLICATIONS

This application is the national stage of International Application No. PCT/KR2020/002219, filed on Feb. 17, 2020, which claims priority, under 35 U. S.C. 119(a), to Korean Patent Application No. 10-2019-0026702 filed in the Korean Intellectual Property Office on Feb. 17, 2020, the disclosure of which is incorporated by reference herein in its entirety.

TECHNICAL FIELD

The present embodiments relate to a steer-by-wire steering device, and more particularly, to a steer-by-wire steering device that may provide a better steering feel by mechanically stopping the steering shaft from rotating when the driver applies a steering torque greater than the reaction torque of the reaction force motor to the steering shaft.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

However, such a steer-by-wire steering device lacks mechanical connection between the steering shaft and the wheels, which may lead to indefinite rotation of the driver's steering wheel, with the result of a poor steering feel.

In other words, when the rotation of the wheels reaches the maximum point (when the steering wheel or the wheels are in a full-turn state in a common steering device) or when a wheel may no longer rotate due to a curb of the road, the steering shaft does not rotate anymore, there is an arising need for the capability of informing the driver of such an occasion by stopping the steering shaft from further rotation.

DETAILED DESCRIPTION OF THE INVENTION

Technical Problem

The present embodiments have been conceived in the above-described background and aims to provide a better steering feel by mechanically stopping the steering shaft from rotating when the driver applies a steering torque greater than the reaction torque of the reaction force motor to the steering shaft.

The objects of the present embodiments are not limited to the foregoing and other objects will be apparent to one of ordinary skill in the art from the following detailed description.

Technical Solution

According to the present embodiments, there may be provided a steer-by-wire steering device, comprising: a steering shaft connected with one end of a torsion bar and having a first gear part formed on an outer circumferential surface thereof, a first rotor rotatably coupled inside a housing to be connected with a motor, connected with other end of the torsion bar, and having a hollow receiving part at one side thereof, the hollow receiving part axially extending and having a second gear part formed on an inner circumferential surface thereof, a second rotor having a third gear part on an outer circumferential surface thereof, the third gear part engaged with the first gear part and the second gear part therebetween, and a stopper provided with the second rotor and limiting a range of a rotation angle of the second rotor when the second rotor rotates between the first gear part and the second gear part.

Advantageous Effects

According to the present embodiments, it is possible to provide a better steering feel by mechanically stopping the steering shaft from rotating when the driver applies a steering torque greater than the reaction torque of the reaction force motor to the steering shaft.

MODE FOR CARRYING OUT THE INVENTION

Hereinafter, embodiments of the present embodiments are described in detail with reference to the accompanying drawings. The same or substantially the same reference denotations are used to refer to the same or substantially the same elements throughout the specification and the drawings. When determined to make the subject matter of the present invention unclear, the detailed description of the known configurations or functions may be skipped.

Such denotations as "first," "second," "A," "B," "(a)," and "(b)," may be used in describing the components of the present embodiments. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

Figure 1:
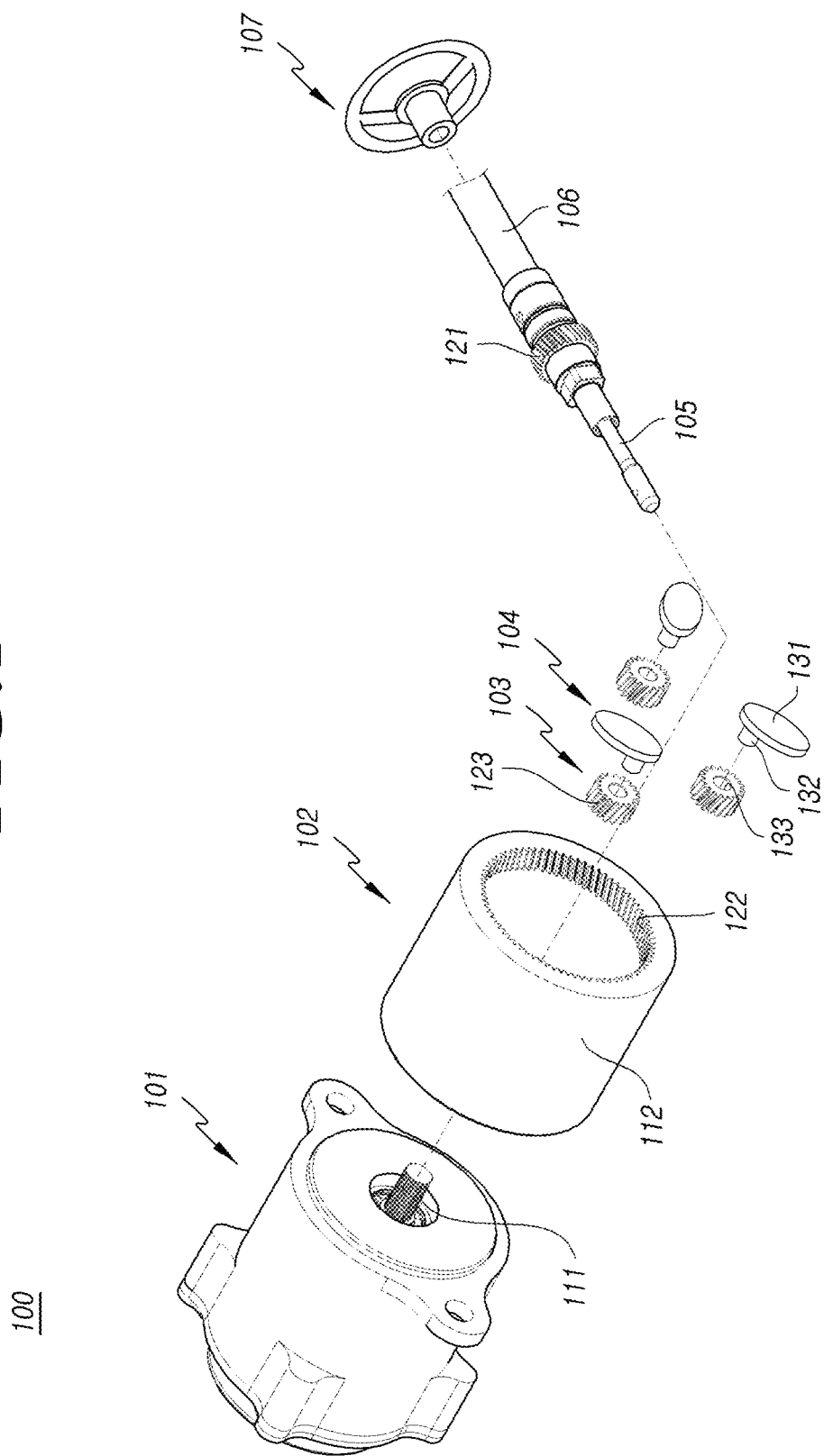
FIG. 1 is an exploded perspective view illustrating a steer-by-wire steering device according to the present embodiments.
Figure 2:
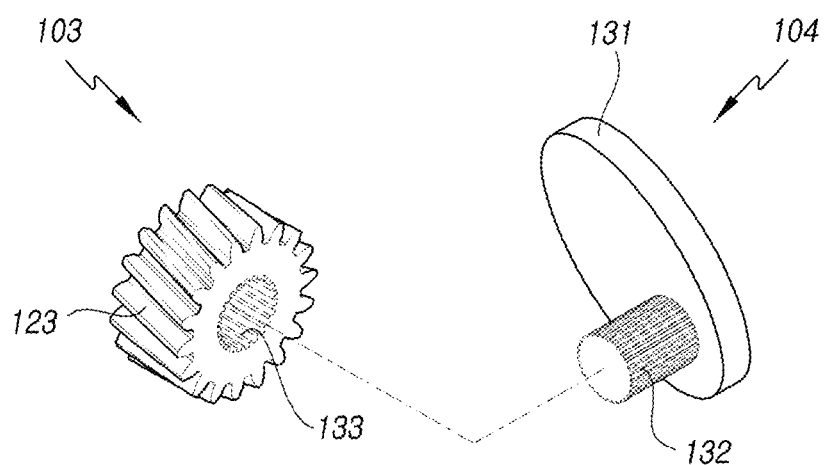
FIG. 2 is a perspective view illustrating a portion of FIG. 1.
Figure 11:
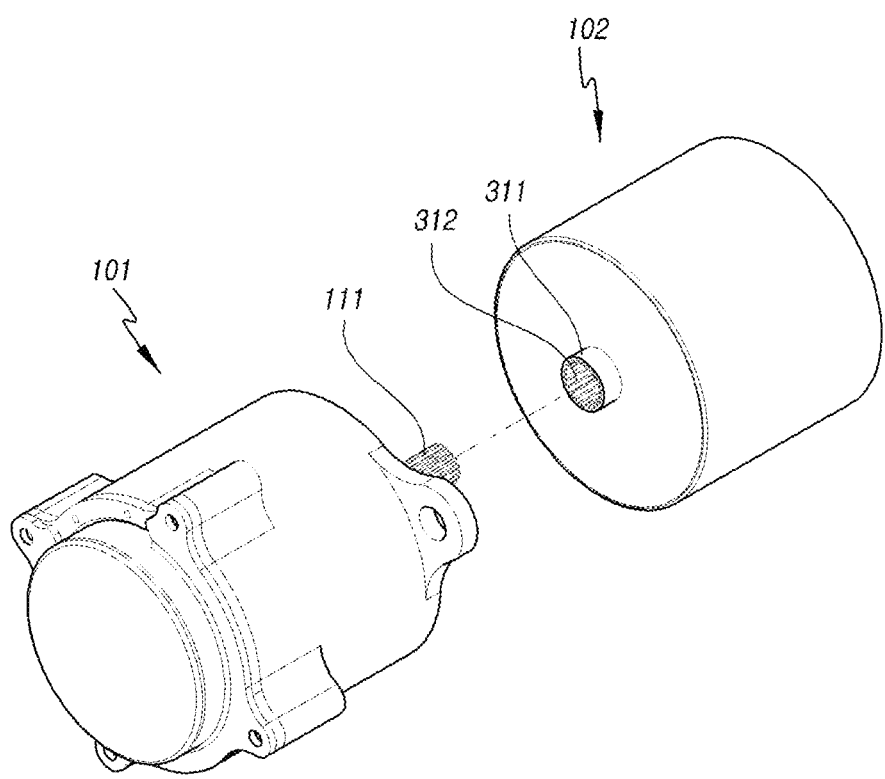
FIGS. 11 and 12 are perspective views illustrating a portion of a steer-by-wire steering device according to the present embodiments.
Figure 12:
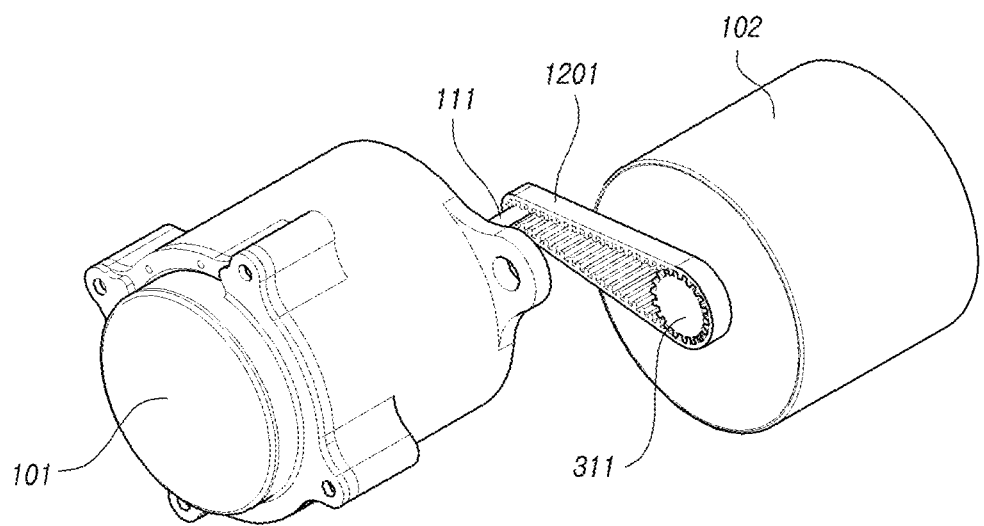

FIG. 1 is an exploded perspective view illustrating a steer-by-wire steering device according to the present embodiments. FIG. 2 is a perspective view illustrating a portion of FIG. 1. FIGS. 3 to 10 are cross-sectional views illustrating operation states of a steer-by-wire steering device according to the present embodiments. FIGS. 11 and 12 are perspective views illustrating a portion of a steer-by-wire steering device according to the present embodiments.

Referring to the drawings, according to the present embodiments, a steer-by-wire steering device 100 includes a steering shaft 106 connected with one end of a torsion bar 105 and having a first gear part 121 formed on an outer circumferential surface thereof, a first rotor 102 rotatably coupled inside a housing 301 to be connected with a motor 101, connected with other end of the torsion bar 105, and having a hollow receiving part 112 at one side thereof, the hollow receiving part 112 axially extending and having a second gear part 122 formed on an inner circumferential surface thereof, a second rotor 103 having a third gear part 123 on an outer circumferential surface thereof, the third gear part 123 engaged with the first gear part 121 and the second gear part 122 therebetween, and a stopper 104 provided with the second rotor 103 and limiting a range of a rotation angle of the second rotor 103 when the second rotor 103 rotates between the first gear part 121 and the second gear part 122.

The steering shaft 106 is connected with a steering wheel 107 and is rotated by the driver's manipulation. An electronic control unit provided in the vehicle receives sensed data from, e.g., a torque sensor or angle sensor connected to the steering shaft 106 and transmits signals for steering the wheels, which are produced from the sensed data.

Such sensors may include a motor position sensor, various radars, or camera image sensors for transmitting steering information to the electronic control unit, and no detailed description thereof is given below.

The steering shaft 106 is provided with a reaction force motor. Based on the data sensed from the torque sensor, the electronic control unit operates the reaction force motor to generate a reaction force torque in the opposite direction to the steering torque generated when the driver manipulates the steering wheel 107.

In such a steer-by-wire steering device, since there is no mechanical connection between the steering shaft 106 and the wheels, the driver may indefinitely rotate the steering wheel 107. Thus, a mechanical restriction is required to stop the rotation at an arbitrary angle.

In other words, when the steering wheel 107 reaches the maximum number of turns or a wheel is stuck to the curb of the road, the driver's steering torque increases, and so does the reaction force torque of the reaction force motor. To prevent the steering shaft 106 from further rotating when the reaction force motor reaches its maximum output, the steer-by-wire steering device 100 according to the present embodiments includes the motor 101, the torsion bar 105, the first rotor 102, the second rotor 103, and the stopper 104.

The one end of the torsion bar 105 is coupled with the steering shaft 106, and the other end thereof is coupled with the first rotor 102.

The one end of the torsion bar 105 may be inserted into and coupled to the steering shaft 106, and the other end of the torsion bar 105 may be inserted into a hole 314 formed in a side of the first rotor 102 and be coupled. Although not illustrated in the drawings, a serration may be formed at the other end of the torsion bar 105 and the hole 314 so that the other end of the torsion bar 105 and the first rotor 102 may be coupled together to be circumferentially fixed.

The first rotor 102 is rotatably coupled inside of the housing 301 to be connected with the motor 101 and has a hollow receiving part 112 at axial one side thereof, which faces the steering shaft 106. The hollow receiving part 112 axially extends and has a second gear part 122 formed on the inner circumferential surface thereof. The second gear part 122 may be formed at an end of the receiving part 112 as illustrated in the drawings. A protrusion 311 is formed at other side of the first rotor 102 to be coupled to the housing 301 via a bearing 313, which is described below in detail.

In other words, the torsion bar 105 is located inside the receiving part 112, the torsion bar 105 is inserted into the receiving part 112, and the other end of the torsion bar 105 is coupled to the first rotor 102.

The motor 101 is coupled to the first rotor 102 so that the torque from the motor 101 is applied to the first rotor 102. Thus, the torsion bar 105 connecting the steering shaft 106 and the first rotor 102 are twisted by the motor 101 and the driver's steering torque. A detailed coupled structure of the first rotor 102 and the motor 101 is described below.

The first gear part 121 is formed on the outer circumstantial surface of the steering shaft 106, and the second gear part 122 is formed on the inner circumstantial surface of the receiving part 112. The third gear part 123 engaged between the first gear part 121 and the second gear part 122 is formed on the outer circumferential surface of the second rotor 103.

In this case, the second rotor 103 is provided with the stopper 104 for limiting the range of the rotation angle of the second rotor 103. When the reaction force motor reaches the maximum output, the rotation of the second rotor 103 is restricted by the stopper 104, so that the rotation of the steering shaft 106 is stopped by the first to third gear parts 121, 122, and 123.

In other words, when the reaction force motor reaches the maximum output, the motor 101 is operated, and the torsion bar 105 is twisted, so that a phase difference occurs between opposite ends, that is, the steering shaft 106 and the first rotor 102. The second rotor 103 provided between the first gear part 121 formed on the steering shaft 106 and the second gear part 122 formed in the first rotor 102 is rotated by the phase difference and, as the rotation of the second rotor 103 is restricted by the stopper 104, the steering shaft 106 is mechanically stopped from rotation.

The stopper 104 is provided with a supporting part 131 radially protruding outward from the second rotor 103, and the supporting part 131 is supported on, e.g., the housing 301 or the receiving part 112 to limit the range of the rotation angle of the second rotor 103. This is described below in detail.

The drawings illustrate embodiments in which the supporting part 131 is provided in an elliptical shape but, without being limited thereto, the supporting part 131 may be formed in other shapes.

Described is a process in which the rotation of the second rotor 103 is restricted by the stopper 104 to stop the rotation of the steering shaft 106. First, in a situation where the wheels may be freely steered, the steering shaft 106, the first rotor 102, and the second rotor 103 are rotated together about the central axis of the steering shaft 106. In this case, since the reaction force motor does not reach the maximum output, the motor 101 is not operated.

In the case where the steering wheel 107 reaches the maximum number of turns or a wheel is stuck to a curb of the road, if the reaction force motor reaches the maximum output by the driver's steering torque, the motor 101 is operated, the stopper 104 is supported by, e.g., the housing 301 by the operation of the motor 101 to restrict the rotation of the second rotor 103 and, as the rotation of the second rotor 103 is restricted, the rotation of the steering shaft 106 engaged with the second rotor 103 is restricted by the first to third gear parts 121, 122, and 123.

Meanwhile, there may be provided two or more of second rotors 103 and, as each of the second rotors 103 has a stopper 104, the number of stoppers 104 supported by, e.g., the housing 301 to prevent rotation of the steering shaft 106 increases, and the stability may thus be enhanced.

In other words, as the number of stoppers 104, which are supported by, e.g., the housing 301 and withstand the driver's steering torque, increases so that the driver's steering torque is distributed, enhanced stability may be achieved.

The drawings illustrate an embodiment in which three second rotors 103 are provided as an example but, without being limited thereto, more second rotors 103 may be provided.

Meanwhile, the stopper 104 may be integrally formed with the second rotor 103 or may be separately manufactured and combined.

Referring to FIG. 2, if the stopper 104 and the second rotor 103 are separately manufactured, either the stopper 104 or the second rotor 103 is provided with a protrusion 132 protruding axially, and the other is provided with an insertion part 133 corresponding to the protrusion 132. As the protrusion 132 is inserted into the insertion part 133, the stopper 104 and the second rotor 103 may be coupled to each other.

Although the drawings illustrate an embodiment in which the insertion part 133 is formed in the second rotor 103 and the protrusion 132 is formed in the stopper 104, the protrusion 132 may be formed in the second rotor 103, and the insertion part 133 may be formed in the stopper 104 as described above.

As illustrated in the drawings, serrations may be formed on the outer circumferential surface of the protrusion 132 and on the inner circumferential surface of the insertion part 133 and, when the second rotor 103 and the stopper 104 are coupled to each other, they are fixed in the circumferential direction.

Meanwhile, as described above, the stopper 104 for preventing rotation of the second rotor 103 is provided with the supporting part 131. The supporting part 131 is formed to radially protrude outward from the second rotor 103.

In other words, when the second rotor 103 rotates, the end of the supporting part 131 draws a circle having a larger radius than the outer circumferential surface of the second rotor 103 and, thus, when the steering shaft 106 is rotated to the right or left, the supporting part 131 is supported by, e.g., the housing 301 or the receiving part 112, limiting the range of the rotation angle of the second rotor 103.

This stopper 104 may be provided on at least one of one side of the second rotor 103, axially facing the steering shaft 106, or other side of the second rotor 103, axially facing the motor 101. The position where the supporting part 131 is supported when the second rotor 103 rotates may be varied depending on when the stopper 104 is provided on the one side and when the stopper 104 is provided on the other side.

In other words, although only the case in which the stopper 104 is provided on either the one or the other side of the second rotor 103 in the axial direction is illustrated in the drawings, stoppers 104 may be provided on both the sides.

Further, depending on the thickness of the supporting part 131, the inner diameter of the housing 301 or the receiving part 112, and the outer diameter of the steering shaft 106, the angular range in which the second rotor 103 is rotatable and the position where the supporting part 131 is supported may be varied, which may be appropriately selected considering the torsional rigidity of the torsion bar 105, the maximum torsion angle, and the maximum output of the reaction force motor.

If the stopper 104 is provided on the axial one side of the second rotor 103, the second rotor 103 is rotated, and the supporting part 131 is supported on the outer circumferential surface of the steering shaft 106 to thus limit the range of the rotation angle of the second rotor 103.

Figure 3:
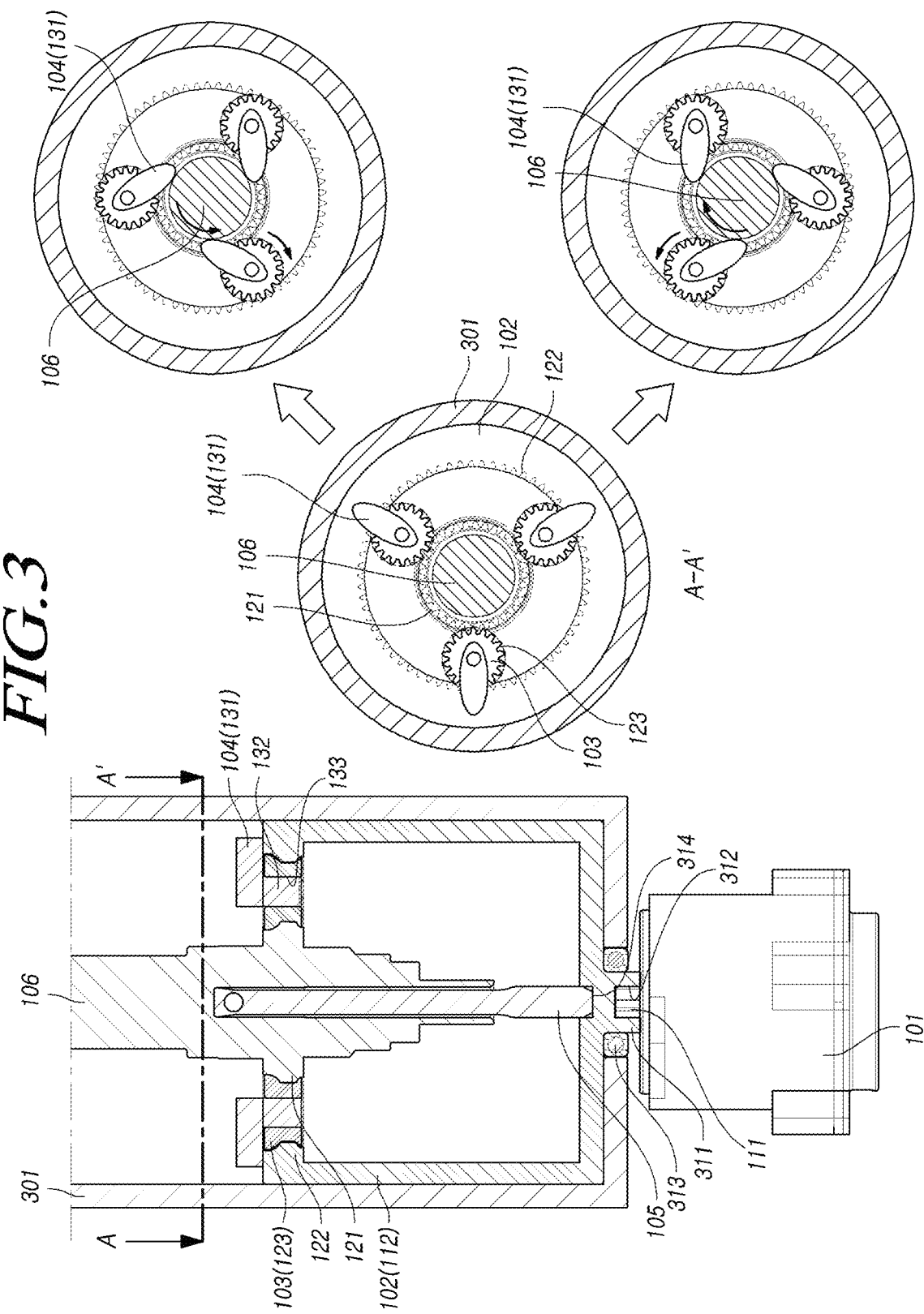
FIGS. 3 to 10 are cross-sectional views illustrating operation states of a steer-by-wire steering device according to the present embodiments.

Referring to a first embodiment illustrated in FIG. 3, the second gear part 122 is formed at one end of the receiving part 112, so that the stopper 104 is not stuck to the receiving part 112 or the housing 301 when the second rotor 103 rotates and, when the steering shaft 106 is rotated to one side or the opposite, the supporting part 131 is supported on the outer circumferential surface of the steering shaft 106 while restricting rotation of the second rotor 103.

As the supporting part 131 is supported on the outer circumferential surface of the steering shaft 106 and the range in which the second rotor 103 is rotatable is limited by the stopper 104, the rotation of the steering shaft 106 is prevented.

Or, as the supporting part 131 is supported on the outer circumferential surface of the steering shaft 106 or the inner circumferential surface of the housing 301, the rotation angle range of the second rotor 103 may be limited.

Figure 4:
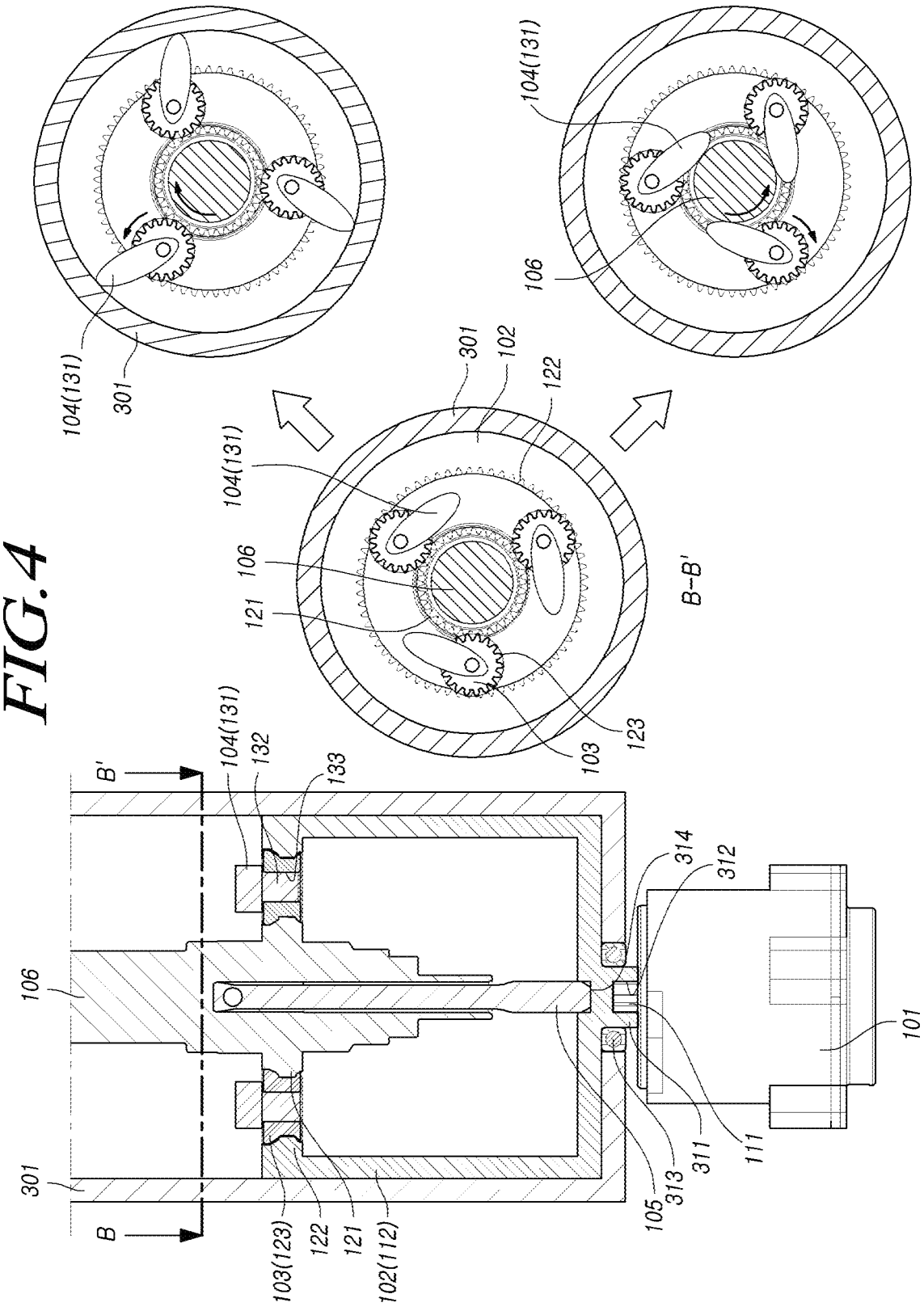

Referring to a second embodiment illustrated in FIG. 4, the supporting part 131 radially extends as compared with the above-described first embodiment, so that the supporting part 131 is supported on the inner circumferential surface of the housing 301 when the steering shaft 106 is rotated to one side, and the supporting part 131 is supported on the outer circumferential surface of the steering shaft 106 when the steering shaft 106 is rotated to the opposite side, restricting rotation of the second rotor 103.

In this case, the rotatable range of the second rotor 103 would be reduced as compared to when the supporting part 131 is supported only on the outer circumferential surface of the steering shaft 106 as described above.

Or, as the supporting part 131 is not stuck to the outer circumferential surface of the steering shaft 106 but is supported on the inner circumferential surface of the housing 301 or the inner circumferential surface of the receiving part 112, the rotation angle range of the second rotor 103 may be limited.

In this case, the steering shaft 106 may have a first stepped part 501 which is formed as the outer circumferential surface of axial one side thereof is radially depressed from the first gear part 121 to prevent the supporting part 131 from being stuck to the outer circumferential surface of the steering shaft 106 when the second rotor 103 rotates.

In other words, when the stopper 104 is rotated together with the second rotor 103, the outer circumferential surface of the steering shaft 106 is radially depressed, so that the supporting part 131 radially protruding outward from the second rotor 103 is avoided from being supported by the steering shaft 106.

Figure 5:
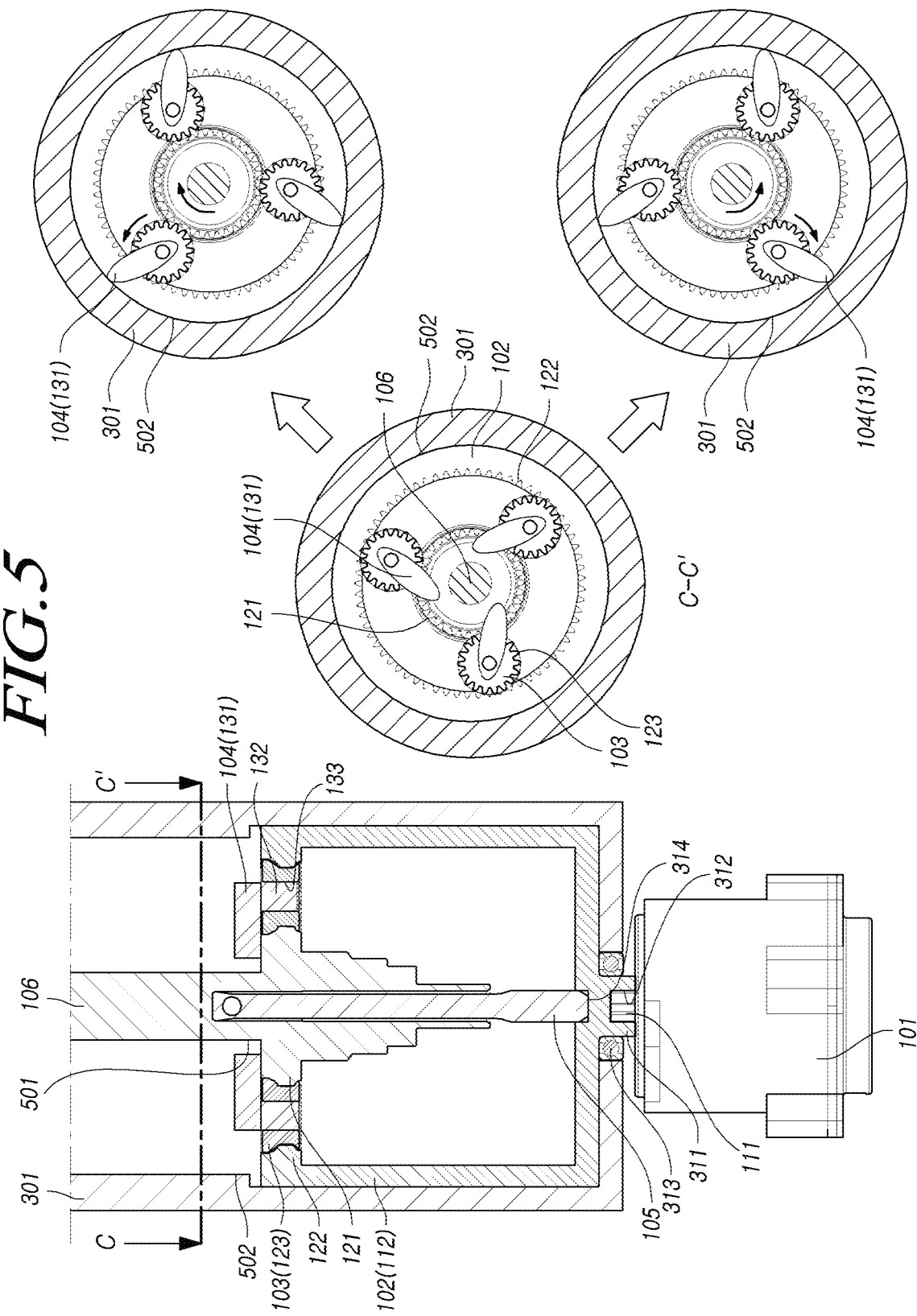

Referring to a third embodiment illustrated in FIG. 5, a second stepped part 502 may be formed which faces the first stepped part 501 and radially protrudes from the inner circumferential surface of the housing 301 to allow the supporting part 131 to be supported on the inner circumferential surface of the housing 301 when the second rotor 103 rotates.

In other words, when the steering shaft 106 is rotated to one side or the opposite, the supporting part 131 may be supported by the second stepped part 502, restricting the rotation of the second rotor 103.

Figure 6:
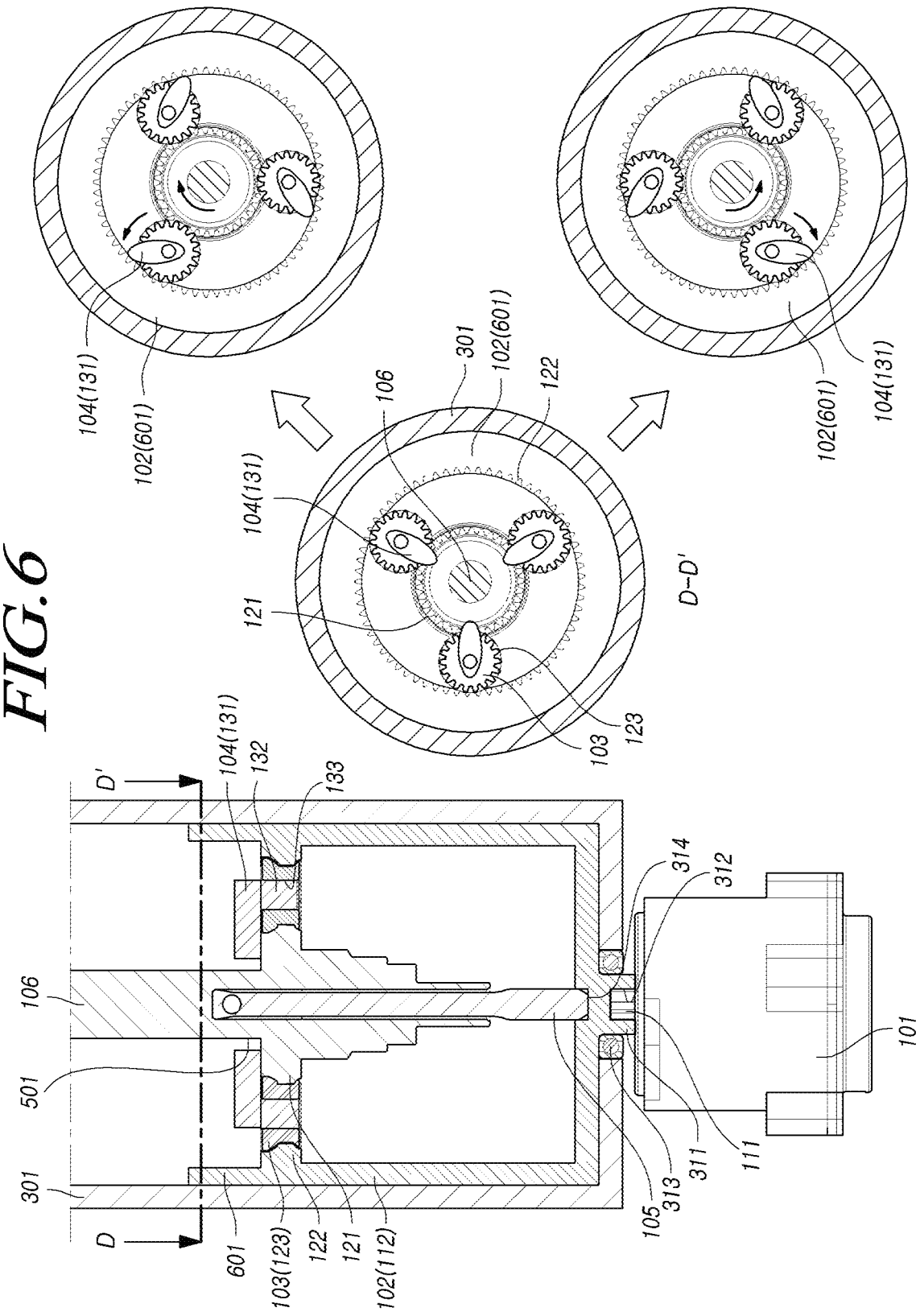

Referring to a fourth embodiment illustrated in FIG. 6, the receiving part 112 may have an extension 601 that extends to an axial side from where the second gear part 122 is formed, to allow the supporting part 131 to be supported on the inner circumferential surface of the receiving part 112 when the second rotor 103 rotates.

In other words, when the steering shaft 106 is rotated to one side or the opposite, the supporting part 131 may be supported on the inner circumferential surface of the extension 601, restricting rotation of the second rotor 103.

Alternatively, the supporting part 131 includes a first supporting part 701 or 1001 and a second supporting part 702 or 1002 and, when the second rotor 103 is rotated and the supporting part 131 is supported on, e.g., the housing 301, stability may be secured.

Figure 7:
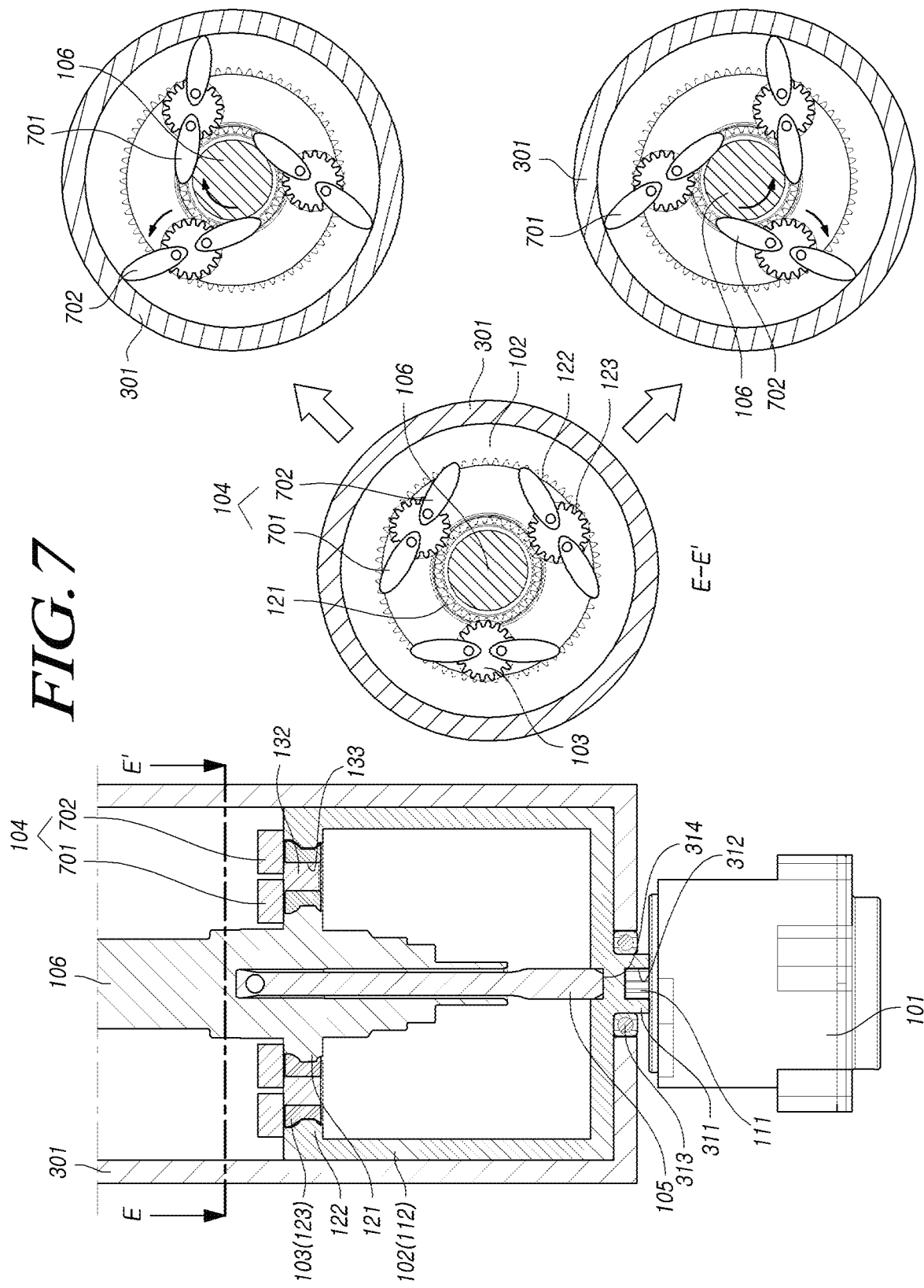

Referring to a fifth embodiment illustrated in FIG. 7, the first supporting part 701 and the second supporting part 702 may be provided to be symmetrical with each other with respect to a line connecting the center of the second rotor 103 with the steering shaft 106, so that when the steering shaft 106 is rotated to one side, the first supporting part 701 is supported on the outer circumferential surface of the steering shaft 106 and the second supporting part 702 is supported on the inner circumferential surface of the housing 301 or, when the steering shaft 106 is rotated to the opposite side, the first supporting part 701 is supported on the inner circumferential surface of the housing 301 or the second supporting part 702 is supported on the outer circumferential surface of the steering shaft 106, restricting rotation of the second rotor 103.

In other words, as the number of supporting parts 131, which are supported by, e.g., the housing 301 and withstand the driver's steering torque, increases so that the driver's steering torque is distributed, enhanced stability may be achieved.

Although FIG. 7 illustrates an embodiment in which the first stepped part 501, the second stepped part 502, or the extension 601 are not formed, the first stepped part 501 may be formed to change the rotatable range of the second rotor 103 in which case the angles at which the first supporting part 701 and the second supporting part 702 are coupled to the second rotor 103 to be simultaneously supported may be varied.

If the stopper 104 is provided on the axial other side of the second rotor 103, the second rotor 103 is rotated, and the supporting part 131 is supported on the outer circumferential surface of the steering shaft 106 and the inner circumferential surface of the receiving part 112 to thus limit the rotation angle of the second rotor 103.

Figure 8:
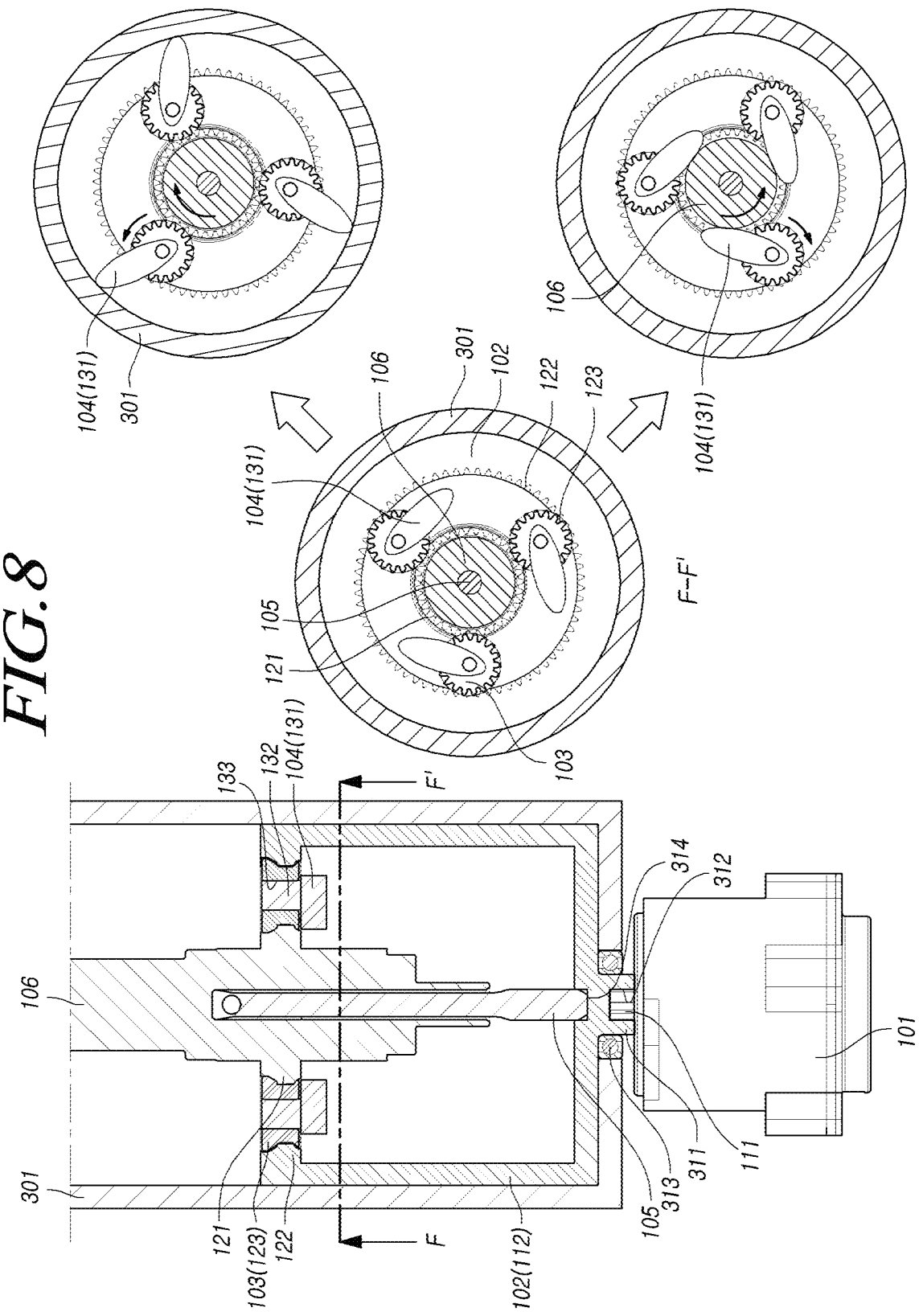

Referring to a sixth embodiment illustrated in FIG. 8, the supporting part 131 is moved between the outer circumferential surface of the steering shaft 106 and the inner circumferential surface of the receiving part 112 when the second rotor 103 rotates, so that when the steering shaft 106 is rotated to one side, the supporting part 131 is supported on the inner circumferential surface of the housing 301 and, when rotating to the opposite side, the supporting part 131 is supported on the outer circumferential surface of the steering shaft 106, restricting rotation of the second rotor 103.

Or, the steering shaft 106 may have a first depressed part 901 which is formed as the outer circumferential surface of axial other side thereof is radially depressed from the first gear part 121 to prevent the supporting part 131 from being stuck to the outer circumferential surface of the steering shaft 106 when the second rotor 103 rotates.

In other words, when the stopper 104 is rotated together with the second rotor 103, the outer circumferential surface of the steering shaft 106 is radially depressed, so that the supporting part 131 radially protruding outward from the second rotor 103 is avoided from being supported by the steering shaft 106.

Figure 9:
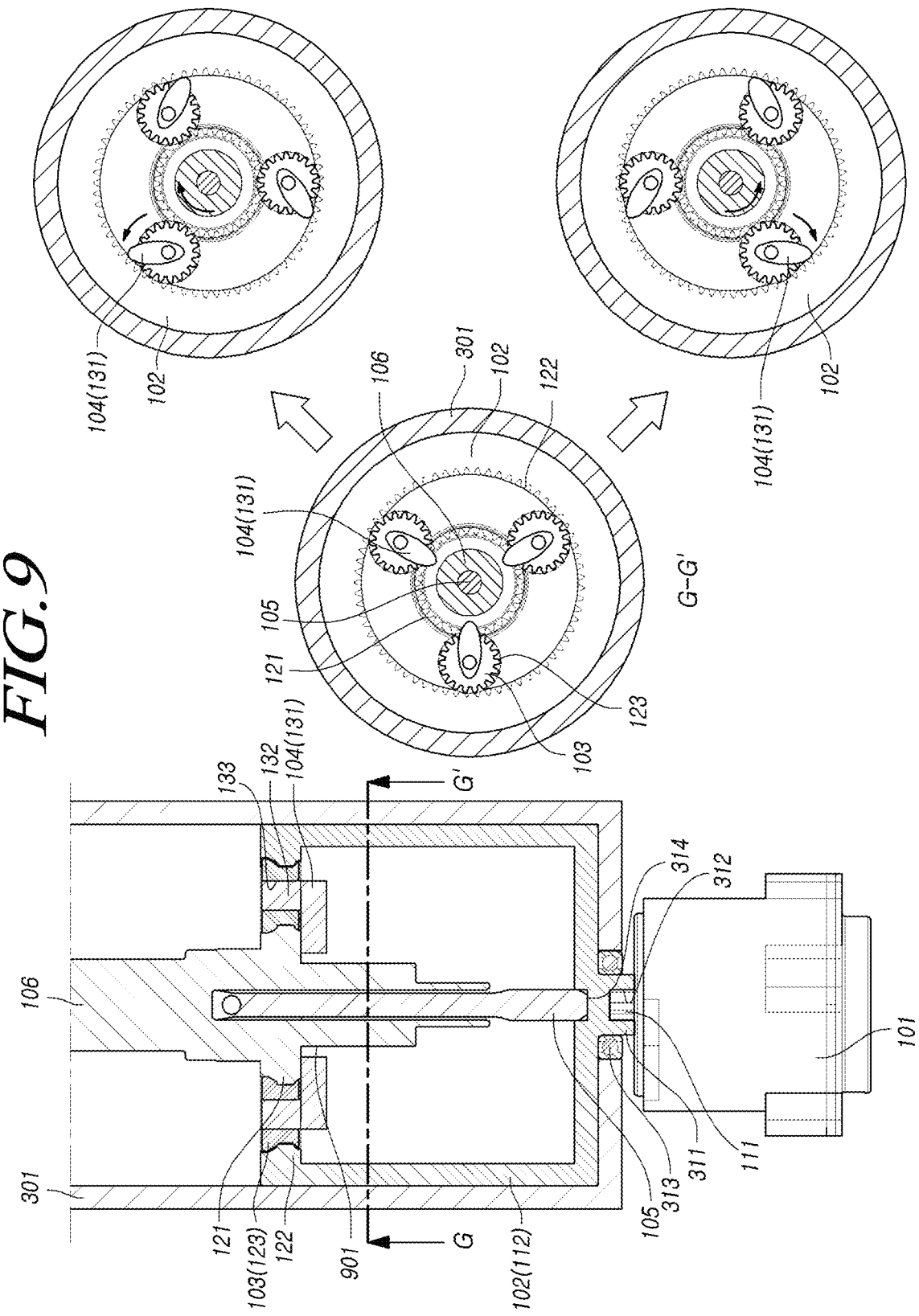

Referring to a seventh embodiment illustrated in FIG. 9, as the depressed part 901 is formed, the supporting part 131 is not stuck to the outer circumferential surface of the steering shaft 106 but is only supported on the inner circumferential surface of the receiving part 112 and, when the steering shaft 106 is rotated to one side or the opposite, the supporting part 131 may be supported on the inner circumferential surface of the receiving part 112, restricting rotation of the second rotor 103.

In this case, the rotatable range of the second rotor 103 may be increased compared to the above-described sixth embodiment.

Figure 10:
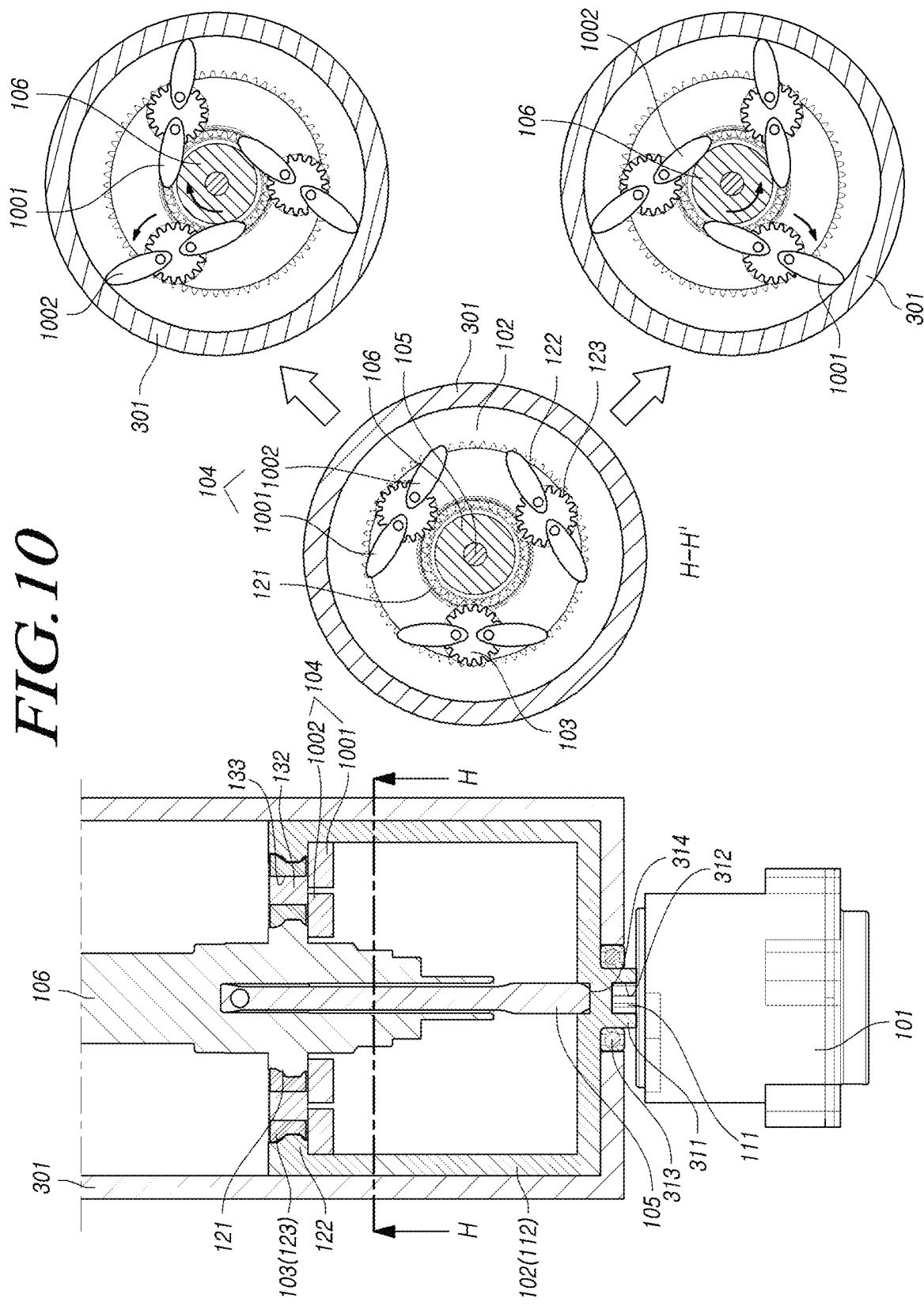

Referring to an eighth embodiment illustrated in FIG. 10, the supporting part 131 includes a first supporting part 1001 and a second supporting part 1002 and, when the second rotor 103 is rotated and the supporting part 131 is supported on, e.g., the housing 301, stability may be secured.

The first supporting part 1001 and the second supporting part 1002 may be provided to be symmetrical with each other with respect to a line connecting the center of the second rotor 103 with the steering shaft 106, so that when the steering shaft 106 is rotated to one side, the first supporting part 1001 is supported on the outer circumferential surface of the steering shaft 106 and the second supporting part 1002 is supported on the inner circumferential surface of the housing 301 or, when the steering shaft 106 is rotated to the opposite side, the first supporting part 1001 is supported on the inner circumferential surface of the housing 301 or the second supporting part 1002 is supported on the outer circumferential surface of the steering shaft 106, restricting rotation of the second rotor 103.

In other words, as described above, as the number of supporting parts 131, which are supported by, e.g., the housing 301 and withstand the driver's steering torque, increases so that the driver's steering torque is distributed, enhanced stability may be achieved.

As such, as the supporting part 131 is supported on, e.g., the housing 301, and the rotation angle range of the second rotor 103 is limited, if the reaction force motor reaches the maximum output, the motor 101 is operated, preventing rotation of the steering shaft 106.

Meanwhile, as described above, the first rotor 102 is rotatably coupled to the housing 301 and is connected to the motor 101. The protrusion 311 which axially protrudes may be provided at the other side of the first rotor 102, and the first rotor 102 and the housing 301 may be coupled together via the bearing 313 couped to the protrusion 311.

Further, referring to FIG. 11, a coupling hole 312 is formed in the protrusion 311, and the motor shaft 111 of the motor 101 is inserted into the coupling hole 312, so that the motor 101 may be coupled with the first rotor 102. The coupling hole 312 and the motor shaft 111 may have a serration, allowing the first rotor 102 and the motor shaft 111 to be coupled to be fixed in the circumferential direction.

Referring to FIG. 12, the protrusion 311 and the motor shaft 111 of the motor 101 may be connected by a belt 1201 and, in this case, the diameter of the protrusion 311 may be formed to be larger than the diameter of the motor shaft 111.

In this case, gears may be formed on the outer circumstantial surface of the protrusion 311 and the motor shaft 111 to be connected by the belt 1201.

When the diameter of the protrusion 311 is formed to be larger than the diameter of the motor shaft 111, the gear ratio between the motor shaft 111 and the first rotor 102 is reduced, and the output of the motor 101 transferred to the first rotor 102 is amplified. Thus, it is possible to use a motor having a small maximum output and thus reduce the size and weight of the motor 101.

Meanwhile, although not illustrated in the drawings, a damping member may be provided on the outer circumferential surface of the supporting part 131. As the damping member is provided, it is possible to absorb the sound of impact that occurs when the supporting part 131 is supported by, e.g., the housing 301.

In other words, when the steering shaft 106 is rotated and the supporting part 131 is supported by, e.g., the housing 301, impact is alleviated by the damping member, so that the impact sound may be reduced.

By the so-shaped steer-by-wire steering device, it is possible to provide a better steering feel by mechanically stopping the steering shaft from rotating when the driver applies a steering torque greater than the reaction torque of the reaction force motor to the steering shaft.

Further, as the protrusion of the first rotor is formed with a larger diameter than the motor shaft of the motor, the gear ratio between the motor and the first rotor reduces, so that large torque may be applied to the first rotor although the output of the motor is reduced. Therefore, it is possible to reduce the size and weight of the motor.

Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority, under 35 U.S.C. 119(a), to Korean Patent Application No. 10-2019-0026702, filed in the Korean Intellectual Property Office on Mar. 8, 2019, the disclosure of which is incorporated by reference herein in its entirety.

The invention claimed is:

1. A steer-by-wire steering device, comprising:
a steering shaft connected with one end of a torsion bar and having a first gear part formed on an outer circumferential surface of the steering shaft;
a first rotor rotatably coupled inside a housing to be connected with a motor, connected with other end of the torsion bar, and having a hollow receiving part at one side of the first rotor, the hollow receiving part extends axially and has a second gear part formed on an inner circumferential surface of the hollow receiving part;
a second rotor having a third gear part on an outer circumferential surface of the second rotor, the third gear part engaged with the first gear part and the second gear part therebetween; and
a stopper provided with the second rotor and limiting a range of a rotation angle of the second rotor when the second rotor rotates between the first gear part and the second gear part,
wherein the first rotor has a protrusion at other side of the first rotor, which axially protrudes.

2. The steer-by-wire steering device of claim 1, wherein the stopper has a supporting part radially protruding outward from the second rotor.

3. The steer-by-wire steering device of claim 2, wherein the stopper is provided on axial other side surface of the second rotor.

4. The steer-by-wire steering device of claim 3, wherein the supporting part is supported on the outer circumferential surface of the steering shaft or the inner circumferential surface of the receiving part to limit the rotation angle of the second rotor.

5. The steer-by-wire steering device of claim 3, wherein the steering shaft is formed with a depressed part as an outer circumferential surface of axial other side of the steering shaft is depressed from the first gear part.

6. The steer-by-wire steering device of claim 5, wherein the supporting part is supported on the inner circumferential surface of the receiving part to limit the rotation angle of the second rotor.

7. The steer-by-wire steering device of claim 3, wherein the supporting part includes a first supporting part and a second supporting part.

8. The steer-by-wire steering device of claim 7, wherein the first supporting part and the second supporting part are provided to be symmetrical with each other with respect to a line connecting a center of the second rotor with a center of the steering shaft.

9. The steer-by-wire steering device of claim 2, wherein the stopper is provided on axial one side surface of the second rotor.

10. The steer-by-wire steering device of claim 9, wherein the steering shaft is formed with a first stepped part as an outer circumferential surface of axial one side of the steering shaft is depressed from the first gear part.

11. The steer-by-wire steering device of claim 10, wherein a second stepped part facing the first stepped part radially protrudes from the inner circumferential surface of the housing, and wherein the supporting part is supported on the second stepped part to limit the rotation angle of the second rotor.

12. The steer-by-wire steering device of claim 10, wherein the receiving part is formed with an extension from where the second gear part is formed to axial one side of the receiving part, and wherein the extension is supported on an inner circumferential surface of the extension to limit the rotation angle of the second rotor.

13. The steer-by-wire steering device of claim 9, wherein the supporting part includes a first supporting part and a second supporting part.

14. The steer-by-wire steering device of claim 13, wherein the first supporting part and the second supporting part are provided to be symmetrical with each other with respect to a line connecting a center of the second rotor with a center of the steering shaft.

15. The steer-by-wire steering device of claim 2, wherein the supporting part is supported on the outer circumferential surface of the steering shaft to limit the rotation angle of the second rotor.

16. The steer-by-wire steering device of claim 1, wherein the protrusion has a coupling hole, and wherein a motor shaft of the motor is inserted into the coupling hole to couple the motor with the first rotor.

17. The steer-by-wire steering device of claim 1, wherein the protrusion and a motor shaft of the motor are connected by a belt.

18. A steer-by-wire steering device, comprising:
- a steering shaft connected with one end of a torsion bar and having a first gear part formed on an outer circumferential surface of the steering shaft;
- a first rotor rotatably coupled inside a housing to be connected with a motor, connected with other end of the torsion bar, and having a hollow receiving part at one side of the first rotor, the hollow receiving part extends axially and has a second gear part formed on an inner circumferential surface of the hollow receiving part;
- a second rotor having a third gear part on an outer circumferential surface of the second rotor, the third gear part engaged with the first gear part and the second gear part therebetween; and
- a stopper provided with the second rotor and limiting a range of a rotation angle of the second rotor when the second rotor rotates between the first gear part and the second gear part,
wherein either the stopper or the second rotor has a protrusion axially protruding, and the other has an insertion part corresponding to the protrusion, and wherein as the protrusion is inserted into the insertion part, the stopper and the second rotor are coupled to each other.

19. A steer-by-wire steering device, comprising:
- a steering shaft connected with one end of a torsion bar and having a first gear part formed on an outer circumferential surface of the steering shaft;
- a first rotor rotatably coupled inside a housing to be connected with a motor, connected with other end of the torsion bar, and having a hollow receiving part at one side of the first rotor, the hollow receiving part extends axially and has a second gear part formed on an inner circumferential surface of the hollow receiving part;
- a second rotor having a third gear part on an outer circumferential surface of the second rotor, the third gear part engaged with the first gear part and the second gear part therebetween; and
- a stopper provided with the second rotor and limiting a range of a rotation angle of the second rotor when the second rotor rotates between the first gear part and the second gear part,
wherein the stopper has a supporting part radially protruding outward from the second rotor, and
wherein the supporting part is supported on the outer circumferential surface of the steering shaft or the inner circumferential surface of the housing to limit the rotation angle of the second rotor.

* * * * *